(12) United States Patent
Book et al.

(10) Patent No.: US 8,613,380 B2
(45) Date of Patent: Dec. 24, 2013

(54) LOAD CARRIER FOR SECURING BICYCLE FORK ASSEMBLIES

(75) Inventors: Andreas Book, Huskvarna (SE); Andreas Arvidsson, Sävsjö (SE)

(73) Assignee: Thule Sweden AB, Hillerstorp (SE)

( * ) Notice: Subject to any disclaimer, the term of this patent is extended or adjusted under 35 U.S.C. 154(b) by 348 days.

(21) Appl. No.: 12/838,290

(22) Filed: Jul. 16, 2010

(65) Prior Publication Data

US 2011/0168749 A1   Jul. 14, 2011

Related U.S. Application Data

(63) Continuation of application No. 11/677,271, filed on Feb. 21, 2007, now Pat. No. 7,757,914, which is a continuation of application No. PCT/US2006/031992, filed on Aug. 15, 2006.

(60) Provisional application No. 60/595,893, filed on Aug. 15, 2005.

(51) Int. Cl.
*B60R 9/048* (2006.01)

(52) U.S. Cl.
USPC .......................................... 224/324; 224/924

(58) Field of Classification Search
USPC ......... 224/422, 484, 485, 501, 533, 535–537, 224/315, 319, 324, 924
See application file for complete search history.

(56) References Cited

U.S. PATENT DOCUMENTS

| | | | |
|---|---|---|---|
| 4,964,287 A * | 10/1990 | Gaul | 224/924 |
| 5,362,173 A | 11/1994 | Ng | |
| 5,511,894 A | 4/1996 | Ng | |
| 5,526,971 A * | 6/1996 | Despain | 224/924 |
| 5,875,947 A * | 3/1999 | Noel et al. | 224/324 |
| 6,036,069 A | 3/2000 | Sayegh | |
| 6,425,509 B1 * | 7/2002 | Dean et al. | 224/324 |

(Continued)

FOREIGN PATENT DOCUMENTS

JP    2004161020 A  *  6/2004  ............... B60R 9/10

OTHER PUBLICATIONS

International Search report and Written Opinion mailed Feb. 19, 2008, in corresponding PCT patent applicaation No. PCT/US2006/031992.

*Primary Examiner* — Brian D Nash
*Assistant Examiner* — Corey Skurdal
(74) *Attorney, Agent, or Firm* — Novak Druce Connolly Bove + Quigg LLP

(57) ABSTRACT

A bicycle fork mount for receiving and securing a front axle hub assembly of a through-axle type front bicycle wheel, but which is also temporarily adaptable for receiving a fork of a skewer type front bicycle wheel includes a fork mount body having a hollow for insertably receiving a front axle hub assembly of a through-axle front bicycle wheel. An adapter is received in the hollow and has a fork receiving skewer associated therewith that is configured for translational movement relative to the adapter. A biasing assembly is disposed between the adapter and the skewer and urges the skewer toward an ends-extended configuration in which a pair of fork receiving ends of the skewer are oppositely disposed beyond the lateral sides of the fork mount body and are configured for receiving and releasably securing the fork of a bicycle having a skewer type front wheel to the bicycle fork mount.

24 Claims, 11 Drawing Sheets

(56) References Cited

U.S. PATENT DOCUMENTS 6,758,380 B1 7/2004 Kolda
2007/0012738 A1 1/2007 Grim
2007/0210127 A1 9/2007 Book et al.

\* cited by examiner

LOAD CARRIER FOR SECURING BICYCLE FORK ASSEMBLIES

CROSS REFERENCE TO RELATED APPLICATIONS

The present application is a continuation of U.S. application Ser. No. 11/677,271, filed on Feb. 21, 2007, now U.S. Pat. No. 7,757,914 which is a continuation of international patent application No. PCT/US2006/031992 filed on Aug. 15, 2006, which claims the benefit of U.S. provisional application No. 60/595,893, filed on Aug. 15, 2005. U.S. patent application Ser. No. 11/677,271, international application No. PCT/US06/31992, and U.S. provisional application No. 60/595,893 are each expressly incorporated herein by reference in their entireties.

FIELD

The present invention relates to vehicle load carriers and quick release mechanisms therefor, and more particularly, to load carriers comprising quick release fork mount assemblies.

BACKGROUND

Quick release fork mount assemblies for securing bicycles to load carriers and rack assemblies are known. Examples of quick release fork mount assemblies include U.S. Pat. Nos. 6,758,380, 5,875,947, 5,362,173 and 5,511,894, which patents are expressly incorporated herein by reference in their entireties.

A common feature of the above known quick release fork mount assemblies is that they are all configured for securing "conventional" fork assemblies; that is, for securing those types of bicycle forks that have a pair of prong ends, each of which has a generally U-shaped or C-shaped slot disposed at a terminal end thereof. Typically, thus, to secure a front wheel to a conventional fork, the opposite ends of a wheel axle are slid into the slots of the prongs and secured thereto by means of threaded nuts or a clamping quick release mechanism. Similarly, to secure a conventional fork upon a quick release fork mount assembly, the slots of the forks are first aligned and slid upon opposite ends of a skewer and a force is then asserted upon the prongs of the fork by means of a clamping mechanism. The force asserted upon the prongs to secure the forks to the fork mount body is typically an inwardly directed force, however, outwardly directed forces can also be utilized.

While the above-identified quick release fork mount assemblies are generally satisfactory for slidably receiving and securing most conventional forks, a problem with quick release fork mount assemblies for securing conventional forks is that they are specifically configured for securing conventional forks and cannot secure many types of mountain and off-road type bicycles. The reason for this is that many mountain and off-road bicycles comprise "through-axle" type wheels and "through-axle" forks whose prongs do not have the U-shaped and C-shaped slotted ends of conventional forks. Rather, the terminal ends of the prongs of through-axle type forks comprise closed apertures, which receive wheel axles, wheel hub members, or hollow cylinders therethrough. Consequently, quick release fork mount assemblies designed for securing conventional forks are generally incapable of securing through-axle type forks directly thereto.

One attempt to address the above problem has been to use an adapter that allows a through-axle fork to be secured to a quick release fork mount assembly configured to secure a conventional fork. An example of such an adapter is described in U.S. Pat. No. 6,036,069 (the '069 patent). While the adapter disclosed in the '069 patent is capable for securing through-axle forks to most conventional quick release fork mount assemblies, it can be difficult and time consuming to use the adapters and/or the adapters may not stably secure the bicycle upon the rack/load carrier. Indeed, to secure a bicycle using such adapters, the front bicycle wheel must first be removed from the through-axle fork, the adapter must then be secured to the through-axle fork using a pair of threaded nuts, which requires the use of a wrench, the combined fork and adapter assembly must then be aligned and slid upon the skewer of the conventional quick release fork mount assembly, and the quick release mechanism locked. Another problem is that because most conventional quick release fork mount assemblies utilize single skewers that are loosely held within the fork mount body, or housing, it can be difficult to align the prongs of the adapter with the prong receiving portions of the skewer. This can be particularly difficult when the fork mount assembly is elevated, i.e., installed upon the roof of a vehicle, or when a rather unwieldy bicycle is to be secured. For example, during loading, the prongs of the adapter can strike an end of the skewer and displace it to one side of the fork mount housing. As a result, the end of the skewer (and prong receiving portion) struck by the prong can become hidden within the housing and an unduly long portion of the skewer can extend from the opposite side of the housing. In order to load the bicycle then, the user must re-center the skewer within the housing. Typically, this is accomplished by setting the bicycle aside and then re-centering the skewer, or by attempting to support the bicycle with a single hand while re-centering the skewer with the other hand. As can be appreciated, users experience tremendous frustration when attempting to through axle-forks and adapters therefor on conventional fork mount assemblies.

Another problem with using adapters of the type described in the '069 patent is that the fork mount coupled assembly-adapter-bicycle assembly increases the number of connection points between a bicycle and the fork mount assembly. Consequently, a bicycle secured in this manner is generally not as stably secured as a bicycle whose forks are connected directly to the fork mount assembly. This can be problematic when a transporting vehicle must traverse rough terrain to arrive at a desired cycling location. Additionally, increases in the number of connection points between the bicycle and the fork mount assembly has a tendency to increase the potential for user error, that is, to increase the potential that a user may not correctly load the bicycle upon the adapter or the adapter upon the fork mount assembly. Furthermore, because the width between prongs and/or the width of single prongs can vary between forks, separate specifically sized adapters are typically required to secure each differently sized fork assembly. Also, when it is not in use, the '069 adapter can be easily misplaced, lost or stolen.

What is needed then is a quick release fork mount assembly that is easy to use and which is capable of stably securing a number of different fork types upon a load carrier.

SUMMARY

In an effort to address the above-identified problems, the present invention broadly comprises (includes, but is not necessarily limited to) a bicycle fork mount configured for receiving and securing a through-axle fork thereon, i.e., a fork capable of securing a front axle hub assembly of a through-axle type front bicycle wheel, but which is temporarily adaptable for receiving a conventional fork thereon, i.e., a fork capable of receiving a skewer type front bicycle wheel. A bicycle fork mount according to the invention includes, but is not limited to, a fork mount body, or housing, having a hollow, or void, for insertably receiving a front axle hub assembly of a through-axle front bicycle wheel. An adapter is received in the hollow and has a fork receiving skewer associated therewith that is configured for translational movement relative to the adapter. A biasing assembly is disposed between the adapter and the skewer to urge the skewer toward an ends-extended configuration in which each of a pair of fork receiving ends of the skewer are oppositely disposed beyond lateral sides of the fork mount body. The pair of fork receiving ends of the skewer is configured for receiving and releasably securing the fork of a bicycle having a skewer type front wheel to the bicycle fork mount, i.e., a conventional fork.

In a further embodiment of the invention, the hollow is a substantially cylindrically shaped channel extending through the fork mount body and between lateral sides thereof and the adapter has an exterior surface which is predominantly cylindrically shaped, and which is configured for conformance fit within the hollow of the fork mount body. In some embodiments of the invention, the adapter has an interior trap-space within which the biasing assembly is housed.

In accordance with some embodiments of the invention, the biasing assembly abuttingly engages the adapter and the skewer. In some embodiments, a portion of the biasing assembly abutting the adapter is fixed relative to the fork mount body while a portion of the biasing assembly abutting the skewer translates relative to the fork mount body during return to the ends-extended configuration of the skewer after being displaced therefrom. In further embodiments of the invention, the biasing assembly is a bi-directional spring mechanism capable of urging translational movement of the skewer in either of two directions relative to the adapter and abuttingly engages an interior surface of the trap-space and an exterior surface of the skewer. In some embodiments, the biasing assembly comprises a coil spring in contact with said adapter and said skewer. In other embodiments, the biasing assembly comprises a pair of springs, each in contact with the adapter and the skewer. In some embodiments, each of the pair of springs is a coil spring. In some embodiments, the biasing assembly comprises at least two springs, each in contact with the adapter and the skewer and each of the at least two springs is a coil spring.

In some embodiments of the invention, the skewer is provided with an interference member against which the biasing assembly abuts. In some embodiments, the interference member forms a flange surface against which the biasing assembly abuts and the flange surface projects substantially radially about a longitudinal axis of the skewer. In some embodiments, the radially oriented flange surface is formed by a snap-ring seated in a track provided on the skewer.

In some embodiments of the invention, each one of the pair of fork receiving ends comprises a prong engaging wall and the biasing assembly oppositely displaces each of the prong engaging walls away from the adapter.

In some embodiments of the invention, the bicycle fork mount includes a clamping assembly coupled to the skewer, which is configured to axially displace the skewer between fork securing and fork releasing positions. In some aspects at least one of the prong engaging walls is displaced toward the other when the clamping assembly is moved from the fork releasing position to the fork securing position.

In a further embodiment of the invention, a bicycle fork mount configured for receiving and securing a through-axle fork, but which is temporarily adaptable for receiving a conventional fork, comprises a fork mount body having a hollow configured to insertably receive a front axle hub assembly of a through-axle fork. An adapter is received in the hollow and has a fork receiving skewer associated therewith. The fork receiving skewer is configured for translational movement relative to the adapter. A biasing assembly is disposed between the adapter and the skewer and urges the skewer toward an ends-extended configuration in which the ends of a pair of fork receiving ends of the skewer are oppositely disposed beyond lateral sides of the fork mount body. Each of the pair of fork receiving ends is configured for receiving and releasably securing a slotted prong of a conventional fork to the bicycle fork mount.

In other embodiments of the invention, a fork mount for releasably securing a through-axle fork, or alternatively, a conventional fork, of a bicycle includes a fork mount body having a void for receiving an axle hub member of the through-axle fork, an adapter is receivable in the void and has a skewer associated therewith. The skewer has first and second prong engaging surfaces on opposite ends thereof and is configured for translational movement with respect to the adapter. A biasing assembly is disposed between the adapter and the skewer and urges the skewer such that the first and second prong engaging surfaces are oppositely displaced away from the adapter. The skewer is configured for slidably receiving and releasably securing slotted prongs of the conventional fork.

BRIEF DESCRIPTION OF THE DRAWINGS

The present invention will now be more fully described, by way of example, with reference to the accompanying drawings in which:

FIG. 7c is a front plan view of the skewer/adapter body/clamping assembly of FIG. 7a;

DETAILED DESCRIPTION

Figure 1:
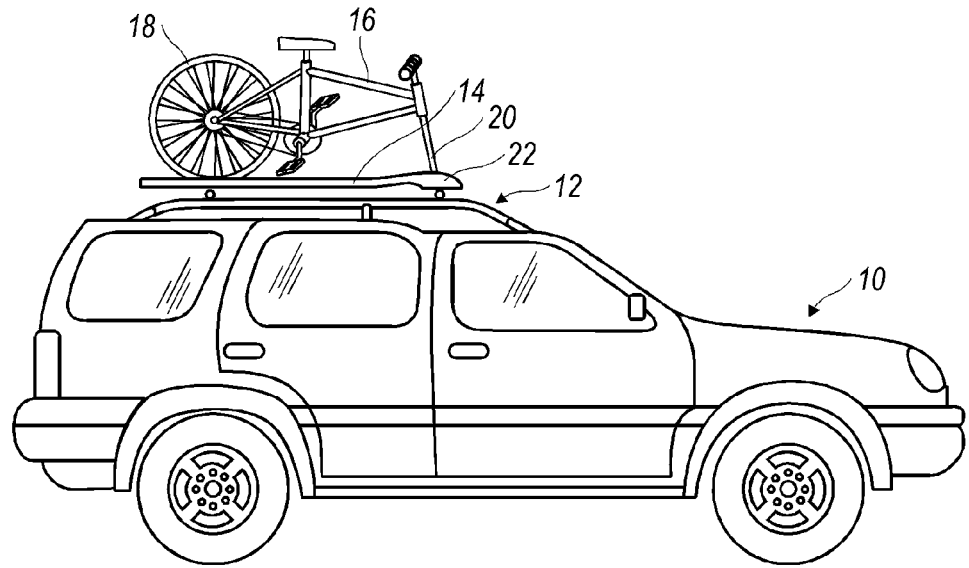
FIG. 1 is a side view of a transporting vehicle and a load carrier comprising a quick release fork mount assembly according to the invention and a bicycle secured thereto.

The present invention will now be more described and disclosed in greater detail. It is to be understood, however, that the disclosed embodiments are merely exemplary of the invention and that the invention may be embodied in various and alternative forms. It should also be understood that the accompanying figures are not necessarily to scale and some features may be exaggerated, or minimized, to show details of particular components. Therefore, specific structural and functional details disclosed herein are not to be interpreted as limiting the scope of the claims, but are merely provided as an example to teach one having ordinary skill in the art to make and use the invention. It should also be appreciated that in the detailed description that follows, like reference numerals on different drawing views are intended to identify like structural elements. It should also be appreciated that while the present invention is primarily described as a fork mount assembly primarily configured for securing bicycles upon roof mounted load carrier by means of their forks, the fork mount assembly is not necessarily limited to securing bicycles and is not necessarily limited to be utilized in association with roof mounted load carriers. Out the outset, it should be appreciated that the term "through-axle", as it refers to forks and wheels, is intended to refer to those types of fork wherein the terminal ends of the fork prongs comprise closed, or closable, apertures for receiving large diameter axles or cylinders therethrough. Typically the axles or cylinders of through-axle forks are 20 mm or greater in diameter and the wheels have hubs for receiving the large diameter axles or cylinders therein. In many cases, the axle or cylinder is slid through the apertures and hub of a wheel after the wheel has been positioned between each side of the fork. This contrasts with "conventional" or "standard" fork assemblies wherein the terminal ends of the fork prongs comprise slotted or open ends, or devises, for slidably receiving a wheel thereon.

Figure 2:
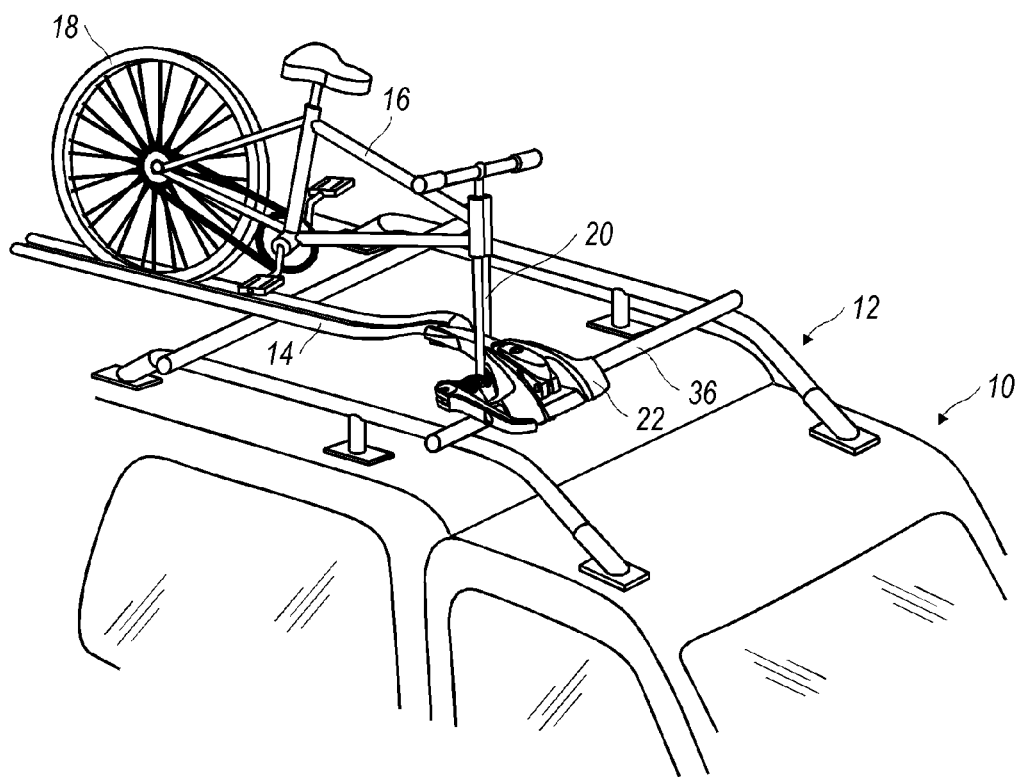
FIG. 2 is a partial perspective view of a transporting vehicle and a load carrier comprising a quick release fork mount assembly according to the invention and a bicycle secured thereto.

Referring now to the figures, FIGS. 1-2 broadly illustrates vehicle 10 securing roof type rack assembly 12. Rack assembly 12 is illustrated as securing load carrier 14 comprising fork mount 22 according to the present invention. Load carrier 14 according to the present invention is broadly configured for securing bicycle 16 thereon by means of rear wheel 18 and fork assembly 20.

Figure 3A:
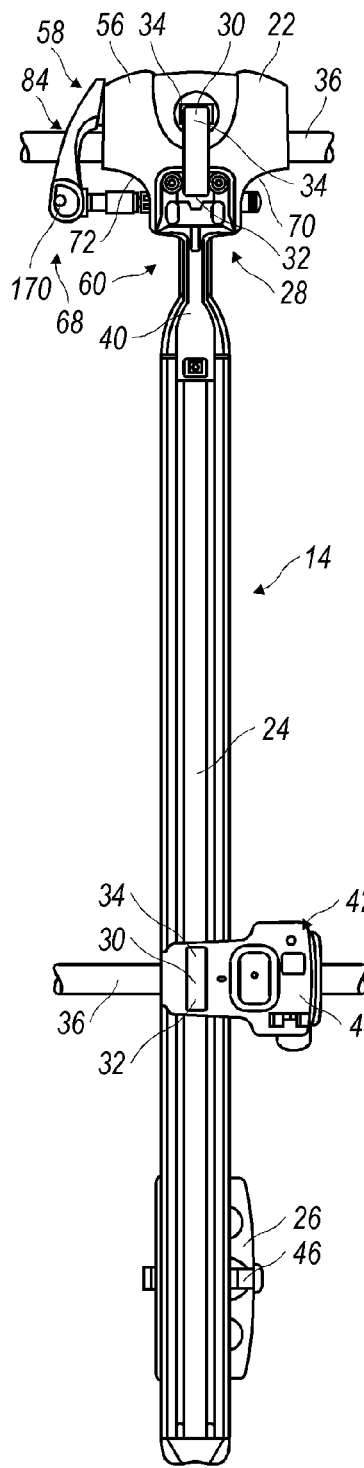
FIG. 3a is a bottom plan view of a load carrier comprising a quick release fork mount assembly according to the invention secured to load support bars of a rack assembly.
Figure 3B:
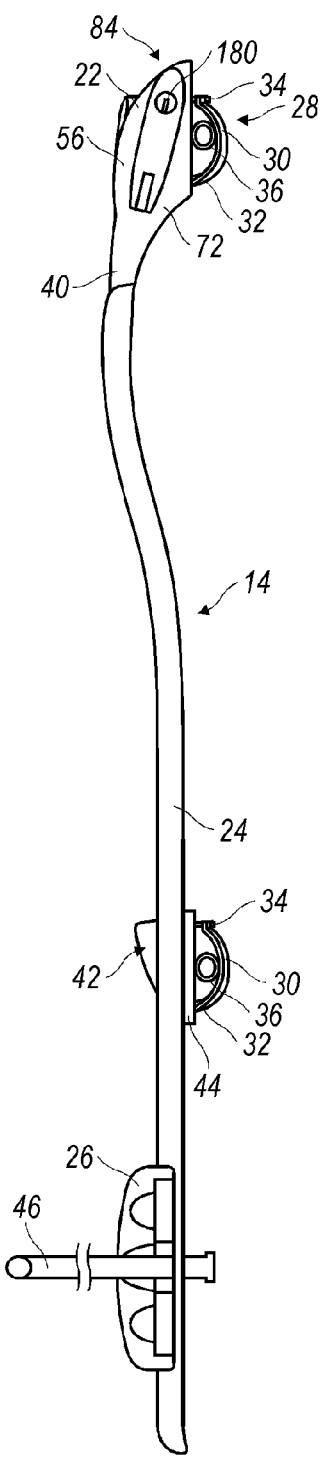
FIG. 3b is a side plan view of a load carrier comprising a quick release fork mount assembly according to the invention secured to load support bars of a rack assembly.
Figure 3C:
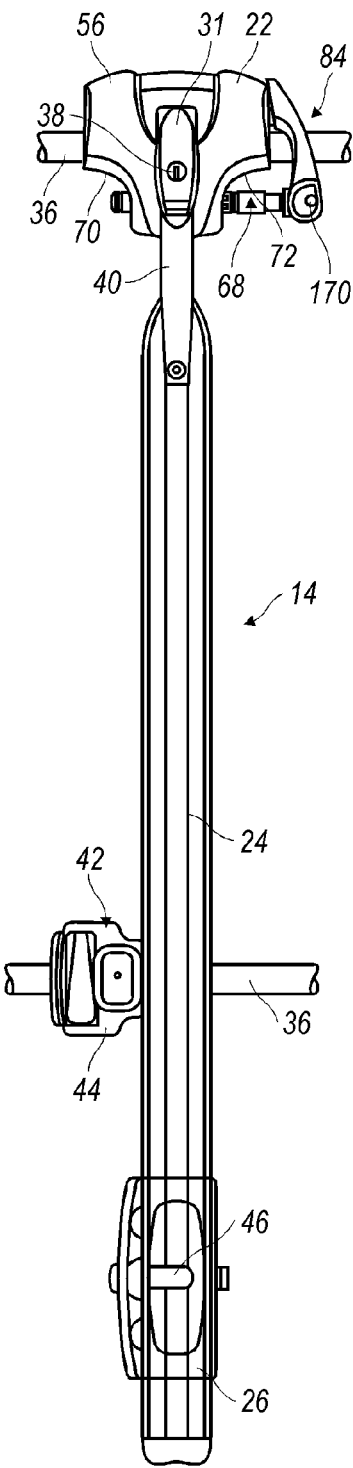
FIG. 3c is a top plan view of a quick release fork mount assembly according to the invention secured to load support bars of a rack assembly.

Referring now to FIGS. 3a-3c, load carrier 14 according to the present invention broadly comprises fork mount 22, wheel tray 24, and rear wheel securing assembly 26. As discussed in more detail, infra, fork mount 22 is configured for receiving and securing forks 20 thereon and is secured to rack assembly 12 by means of front mounting assembly 28. Front mounting assembly 28 generally includes hoop member 30 and clamping member 31. Hoop 30 has a fixed end 32 and a free end 34. Fixed end 32 is connected to a first side of the fork mount housing and free end 34 extends about load support bar 36 to connect with a T-bolt secured to clamping member. The T-bolt is disposed on a side of the load support bar opposite the fixed end. Load support bars 36 can have a square, round or other cross sectional shape. The front mounting assembly, preferably, includes means for adjusting the tension applied upon the hoop such that the fork mount may be securely fastened to the load support bar. Front mounting assembly 28 can include locking mechanism 38 for locking the fork mount upon a load support bar. Plug 40 connects fork mount 22 to wheel tray 24, which is configured for receiving rear wheel 18 of bicycle 16 therein. Wheel tray 24 is has a generally U-shaped cross-section and secures to rack assembly 12 by means of wheel tray mounting assembly 42. Wheel tray mounting assembly 42 is similar to the front mounting assembly in that it also comprises hoop member 30, which has a fixed end 32 and free end 34. Fixed end 32 of the hoop member is connected to a first side of mounting plate 44 and the free end extends about load support bar 36 to connect with a T-bolt of wheel tray mounting assembly 42, which is disposed on a side of the load support bar opposite that of the fixed end 32. The wheel tray mounting assembly may also include means for adjusting the tension applied upon the hoop such that the wheel tray may be securely fastened upon the load bar. The wheel tray mounting assembly can also include a locking mechanism for locking the assembly to the load support bars. Rear wheel securing assembly 26 is provided for securing rear wheel 18 of a bicycle upon the wheel tray and generally includes wheel strap 46, which is secured to the wheel tray by means of a T-shaped channel therein. The wheel strap engages with a clamping assembly to clampingly secure the rear wheel between the strap and the wheel tray.

Referring now to FIGS. 4a-5b, fork mount 22 is configured for receiving and securing a plurality of fork types thereon, including through-axle forks 48 and conventional/standard forks 50 that have devises 52 at the ends of their prongs 54. Fork mount 22 broadly comprises housing 56, which may also be referred to as body 56. Body 56 has head portion 58 and neck portion 60. Head portion 58 secures the fork mount to the load support bars of a vehicle rack assembly and, thus, comprises front mounting assembly 28 as described, supra. Head portion 58 also comprises clamping member 31 and locking mechanism 38 for locking the fork mount to a load support bar of the rack assembly. Head portion 58 includes hollow 62 for receiving axle member (not shown), through-axle adapter 66, or conventional fork adapter 68 therethrough such that through-axle forks 48 or conventional forks 50 may be secured to the fork mount. Neck portion 60 is generally provided for securing the head portion to the wheel tray and comprises plug 40.

In the embodiment illustrated in FIGS. 4a-4e, hollow 62 is configured to pass through the housing of the fork mount and comprises a substantially cylindrical channel that extends between lateral sides 70, 72 of the housing. The cylindrical channel is configured for substantial conformance fit with an axle member (not shown) of a through-axle fork, through-axle fork adapter 66 (See FIGS. 4b-4c) or a conventional fork adapter 68 (See FIG. 4d-4e). Hollow 62, preferably includes recess 74 for receiving locking abutment 76 (See FIGS. 4a, and 7a-8c) for preventing rotational and lateral movement of a cylindrical member disposed therein. It should be appreciated by those having ordinary skill in the art that while hollow 62 is illustrated as comprising a cylindrical channel passing through the body of the fork mount, the hollow need not pass through the housing between lateral sides thereof, or necessarily comprise a cylindrical channel. Indeed, hollow 62 can be disposed on an outer surface of the fork mount housing, can be configured to comprise a pair of apertures disposed on lateral sides of a substantially hollow housing, or be configured to comprise one or more prong-type or sleeve members for slidably receiving portions of an axle member, a through-axle fork adapter, or conventional fork adapter therein.

Figure 4A:
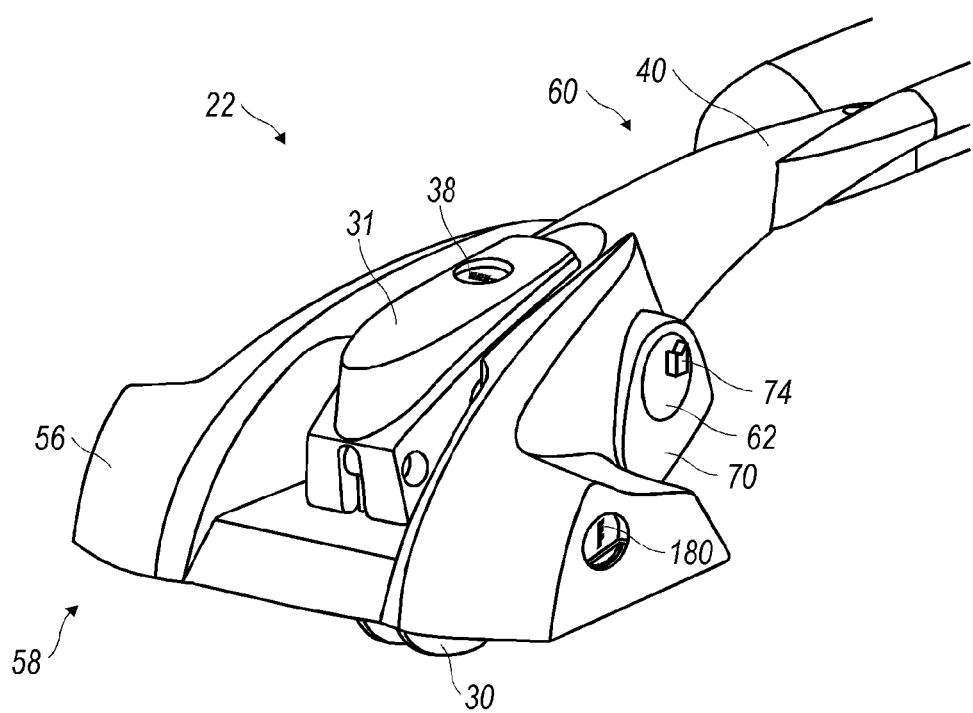
FIG. 4a is a close-up perspective view of a quick release fork mount assembly according to the invention, with adapter(s) removed.
Figure 4B:
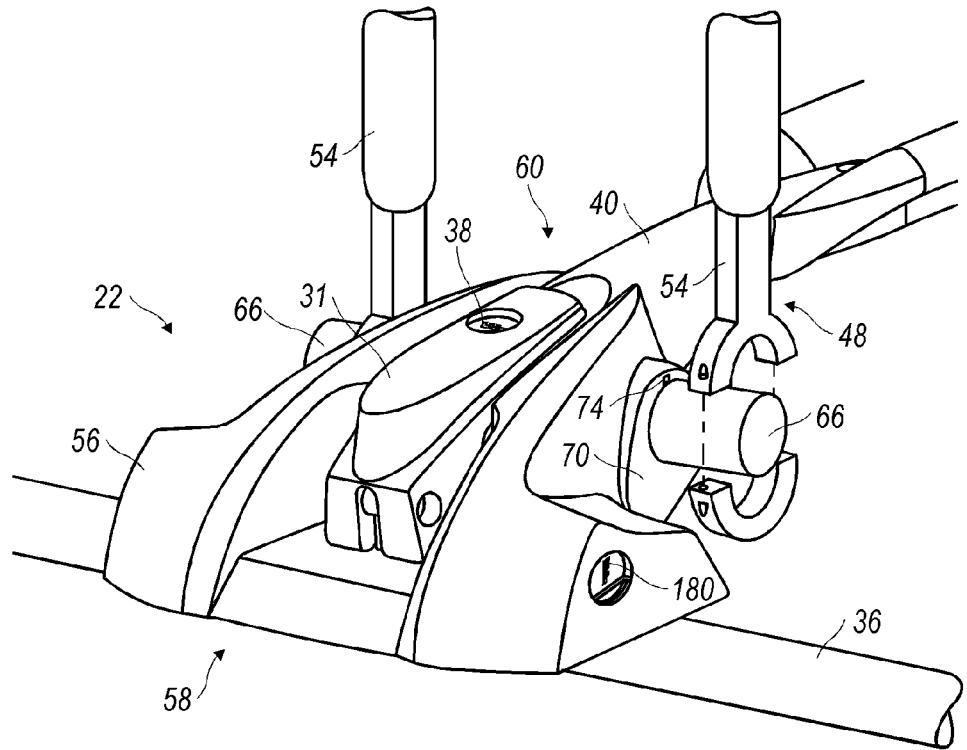
FIG. 4b is a close-up perspective view of a quick release fork mount assembly according to the present invention receiving a through-axle type fork assembly.
Figure 4C:
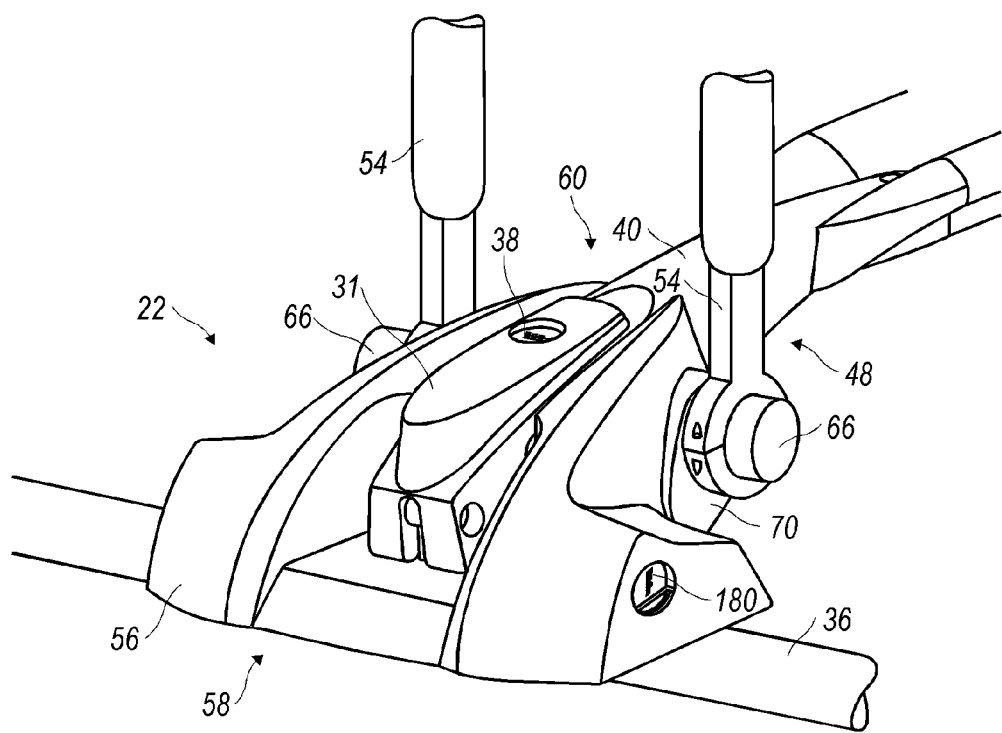
FIG. 4c is a close-up perspective view of a quick release fork mount assembly according to the present invention securing a through-axle type fork assembly.

As illustrated more clearly in FIGS. 4b and 4c, while it may be possible to secure through-axle fork 48 to fork mount 22 by inserting and axle member thereof through hollow 62, it is preferable to secure through-axle fork 48 to the fork mount utilizing through-axle fork adapter 66. The reason for this is that the axle-member of the fork or wheel may not include means for preventing lateral or rotational movement of the assembly within the hollow. As a result, the forks connected to thereto can be rotationally or laterally displaced during transport. As illustrated in FIGS. 4b-4c and 7a-8c, through-axle fork adapter 66 and conventional fork adapter 68, thus, each include locking abutment 76 configured for receipt within recess 74 of hollow 62. Locking abutment 76 may be locked within the hollow by means of a biased pin member (not shown) such that rotational and lateral movement of the adapters, and forks connected thereto, may be prevented. It should also be appreciated that while locking abutment 76, recess 74 and biased pin members are described herein for preventing rotational and lateral movement of the adapters with in the hollow, other appropriate assemblies may be utilized to achieve similar results. For example, biased ball lock mechanisms can be utilized.

Referring now to FIGS. 4d-9c, conventional fork adapter 68 is provided for securing conventional forks 50 to fork mount 22 and is illustrated as broadly comprising adapter body 78, skewer 80, biasing assembly 82 and quick release clamping assembly 84.

As illustrated in FIGS. 4a-9c, adapter body 78 is generally in the form of a cylinder and has outer surface 86 configured for substantial conformance fit within hollow 62. By conformance fit it is meant that there is little to no radial movement between adapter body 78 and the hollow 62 when the adapter body is inserted therein. Adapter body 78 further comprises skewer channel 88, which is longitudinally disposed along the length of the adapter body and, preferably, along the longitudinal axis of the adapter body. In the embodiment illustrated, the skewer channel is generally cylindrical for receiving a generally cylindrical skewer therein and allowing translational movement of the skewer with respect to the adapter body. It should be appreciated that while skewer channel 88 is described and illustrated as being substantially cylindrical, the skewer channel comprises flat portion 90 for receiving corresponding flat portion 92 of the skewer such that rotation of the skewer with respect to the adapter body is prevented. As previously discussed, adapter body 78 also includes locking abutment 76, which protrudes from its outer surface for receipt within recess 74 of hollow 62. Locking abutment 76 is provided for preventing rotational and lateral movement of the adapter body within the hollow. Disposed at opposite outer terminal ends 94, 96 of the adapter body are prong engaging walls 98, 100, which extend perpendicularly with respect to the longitudinal axis of the adapter body. Prong engaging walls 98, 100 are configured for engaging the inner surfaces of the prongs of conventional forks 50 and can comprise knurling or other friction-type surface. As illustrated more clearly in FIGS. 8a-8c, prong engaging wall 98 comprises an outer surface of barrel nut 102, which threadably secures to the adapter body and is displaceable along the longitudinal axis thereof. While barrel nut 102 may be utilized to axially dispose prong engaging surface 98 such that the length of the adapter body may be adjusted to accommodate differently sized forks, or may be axially disposed to modify a bias of the biasing assembly, the primary purpose of barrel nut 102, however, is to provide access to the biasing assembly contained within biasing chamber 104. As illustrated more clearly in FIGS. 7a-8c, biasing chamber 104 is configured for receiving skewer 80 therethrough and, as discussed infra, for receiving biasing and interference members of the biasing assembly therein. In the embodiment illustrated, biasing chamber 104 forms a generally cylindrical chamber extending along a length of the longitudinal axis of the adapter body and is generally concentrically disposed about a portion of the skewer channel. The biasing chamber includes a pair of inner abutment walls 106, 108 disposed on opposite ends of the biasing chamber, and which are configured for abuttingly engaging biasing members of the biasing assembly. In the embodiment illustrated, inner abutment wall 106 comprises a surface of barrel nut 102 and is displaceable along the longitudinal axis of the adapter body. It should be appreciated that while prong engaging wall 100 and inner abutment wall 108 of the biasing chamber are illustrated as being fixed, they may also be configured to be axially displaceable for modifying the length of the adapter body or modifying a bias of biasing assembly 82. Adapter body 78 further includes aperture 110, which extends from an outer surface of the adapter body and to the inner surface of the biasing chamber to thereby form a window into the biasing chamber. Aperture 110 is generally provided for allowing assembly of the biasing assembly within the biasing chamber.

Referring now to FIGS. 4d-9c, skewer 80 is generally provided for slidably receiving clevises 52, or slots, of prongs 54 of conventional forks 50 and securing the forks to the fork mount. As illustrated more clearly in FIGS. 7a-9c, skewer 80 comprises a generally cylindrical structure which is slidably received within the skewer shaft of the adapter body and is configured for translational movement therein. As illustrated more clearly in FIGS. 9a-9c, skewer 80 broadly comprises first skewer end 112, shaft portion 114 and second skewer end 116. First skewer end 112 is generally configured for receiving and abuttingly engaging and securing a first prong of a fork. First skewer end 112 comprises fixed prong engaging member 118 having prong engaging wall 120. Prong engaging wall 120 is generally perpendicularly disposed with respect to the longitudinal axis of the shaft portion, which extends therefrom. Shaft portion 114 is generally cylindrical and is configured for receipt within the skewer channel of the adapter body. Shaft portion 114 includes flat portion 92 and annular recess 122, or recessed track 122. Flat portion 92 complementarily abuttingly engages with flat portion 90 of the skewer channel and is provided for preventing rotational movement of the skewer with respect to the adapter body when the skewer is disposed therein. Annular recess 122 extends about a circumference of the shaft portion and is provided for receiving interference member 124 therein, such as the annular snap ring as illustrated. Annular recess 122 is, preferably, disposed along a length of the skewer such that when the skewer is disposed within skewer channel 88 and biasing chamber 104, the annular recess and interference member 124 associated therewith are substantially centrally disposed between inner abutment walls 106, 108 of the biasing chamber. Second skewer end 116 is generally provided for receiving adjustable prong engaging member 126 and clamping assembly 84 thereon. Second skewer end 116 thus comprises receiving portion 128 and threaded portion 130. Receiving portion 128 of the skewer is generally cylindrical and has a radius that is smaller than that of shaft portion 114. As a result, abutment wall 132 is formed at the interface of shaft portion 114 and receiving portion 128. Threaded portion 130 is generally provided for threadably securing clamping lever 134 of the clamping assembly 84 and axially displacing skewer 80 with respect to adapter body 78. Adjustable prong engaging member 126 includes prong engaging wall 136, which is generally perpendicularly disposed with respect to the longitudinal axis of the skewer, and is axially adjustable with respect thereto. Adjustable prong engaging member 126 is, thus, generally provided for adjusting the width of prong receiving portions 138 between the prong engaging walls of the skewer (120, 136) and the prong engaging walls of the adapter body (98, 100). Adjustable prong engaging member 126, thus, comprises threaded barrel nut portion 140 and threaded bolt portion 142, which are axially adjustable with respect to one another. Threaded barrel nut portion 140 and threaded bolt portion 142 are configured for slidably receiving skewer 80 therethrough, however, threaded barrel nut portion 140 is received about shaft portion 114 of the skewer and the threaded bolt portion 142 is primarily received about receiving portion 128 of the skewer. Disposed between threaded bolt portion 142 and annular abutment 132 about receiving portion 128 is spring 144, which applies a bias to laterally dispose the skewer relative to the adjustable prong engaging member 126. Laterally disposing the skewer relative to the adjustable prong engaging member 126 increases the distance between prong engaging surface 100 of the adapter body and prong engaging wall 136 of the adjustable prong engaging member to thereby ease loading and unloading of a fork from the fork mount.

Referring now to FIGS. 7a-9c, biasing assembly 82 is disposed between the adapter body and the skewer and is provided for bi-directionally biasing the skewer such that the opposite ends of the skewer are each laterally displaced in a direction that is away from the adapter body. Bi-directionally biasing the skewer, thus, eases loading of a conventional fork upon the fork mount because clevis receiving space 138 between the prong engaging walls of the skewer and the prong engaging walls of adapter body 78 can be maintained. As previously discussed, biasing assembly 82 is housed within biasing chamber 104 and, in the embodiment illustrated, includes a pair of identical biasing members 146, 148 for biasing the skewer. Identical biasing members 146, 148 comprise a pair of identical coil springs that interact with inner abutment walls 106, 108 of the biasing chamber, respectively, and interference member 124 of the skewer. As illustrated more clearly in FIGS. 7a-9c, biasing assembly 82 includes a pair of identical coil springs 146 and 148, which are each axially disposed about the skewer on opposite sides of interference member 124. In the embodiment illustrated, interference member 124 is shown as comprising a removable snapring. Arranged in this manner first, inner ends 152 of each of the coil springs abut an opposite side of the interference member and second, outer ends 154 each abut one of the oppositely disposed inner abutment walls of the biasing chamber. Consequently, because the skewer is capable of translational movement within the skewer channel and the biasing chamber, and because coil springs 146 and 148 each apply an identical oppositely directed force upon interference member 124, the skewer is urged to maintain a generally "centered" position with respect to the biasing chamber. In other words, the skewer is oppositely urged by each biasing member until a point of equilibrium is met, which is that point at which the interference member is centrally disposed between inner abutment walls 108, 110 of the biasing chamber. Thus, if the skewer is accidentally laterally displaced with respect to the housing during loading of a bicycle upon the fork mount, the biasing assembly will act to urge the skewer to return to the equilibrium, or centered, position. It should be appreciated by those having skill in the art that while a biasing assembly has been described herein as comprising identical coil springs axially disposed about the skewer, other assemblies for biasing the skewer with respect to the adapter body may be utilized, e.g., a single spring could be utilized, or non-spring biasing assemblies could be utilized. It should also be appreciated that the biasing assemblies need not necessarily be identical to one another such that the skewer may be disposed toward one side of the adapter body. Also, while a single annular recess for receiving an interference member has been described, a skewer may be provided with multiple recesses for adjusting the position of the interference member such that the equilibrium position of the skewer with respect to the adapter body may be modified. It should also be appreciated that the interference member need not comprise a removable annular ring disposed about a circumference of the skewer, but may comprise other structures capable of engaging the springs.

Referring now to FIGS. 5a-9c, clamping assembly 84 is generally provided for axially disposing skewer 80 with respect to adapter body 78 such that the prongs of a conventional fork may be clamped between the prong engaging walls of the skewer 120, 136 and the prong engaging walls 98, 100 of the adapter body, or alternatively, released therefrom. Clamping assembly 84 broadly comprises clamping lever 134, which has a cam portion 156 and lever portion 159. Cam portion 156 is generally arcuate in shape and includes arcuate surface 158 for axially displacing the skewer relative to the adapter body, and flat surfaces 160 and 162, for maintaining the skewer in generally engaged or disengaged positions, 164, and 166, respectively. The arcuate and flat surfaces of the cam portion 156 are configured for abutting cam follower surface 168 of adjustable prong engaging member 126 such that the skewer may be displaced relative thereto. The cam portion of the clamping assembly further includes pivot pin 170, which pivotally mounts the clamping assembly to threaded end 130 of the skewer. Pivot pin 170 is received in a bore of cam portion 156 and is oriented perpendicularly with respect to the longitudinal axis of the skewer. Pivot pin 170 includes first threaded bore 172 for receiving the threaded end of the skewer therein and second threaded bore 174, which is disposed along the longitudinal axis of the pivot pin for receiving set screw 176 therein. Set screw 176 is provided for abutting flat portion 178 of the threaded end of the skewer so such that rotation of the skewer may be prevented. As illustrated in FIGS. 6a-8c, pivot pin 170 is offset with respect to a center axis of the arcuate surface 158 such that the clamping assembly may be displaced between engaging 164 and disengaging 166 positions when the clamping lever portion 159 of the clamping assembly is actuated. More specifically, as illustrated in FIGS. 6a, 7a and 8a, when the clamping assembly is actuated to assume the engaged, fork securing position, the pivot pin is disposed away from the adapter body. On the contrary, as illustrated in FIGS. 6b, 7b and 8c, when the lever portion is moved to assume the disengaged, fork releasing position, the pivot pin is disposed toward the adapter body. Lever portion 159 includes locking mechanism 180, which locks the lever to the housing when the fully engaged position is assumed.

Referring now to FIGS. 4a-4c, to utilize fork mount 22 and adapter 66 to secure a bicycle having through-axle fork 48, a user need first insert through-axle fork adapter 66 through hollow 62 until locking abutment 76 mates with recess 74. A pin member (not shown) of either the recess or the locking abutment may then be utilized to secure the through-axle fork adapter within hollow 62. Thereafter, after having already removed the front wheel from through-axle fork 48, the through-axle fork may then be set upon the ends of the adapter 66 extending from the lateral sides of housing 56. The prongs of the through-axle fork may then be rotationally and laterally secured upon the ends of adapter 66 by clamping the prongs utilizing the clamping members provided on the through-axle fork. Removal of the through-axle fork from the fork mount may be accomplished by reversing the steps set forth above.

Figure 4D:
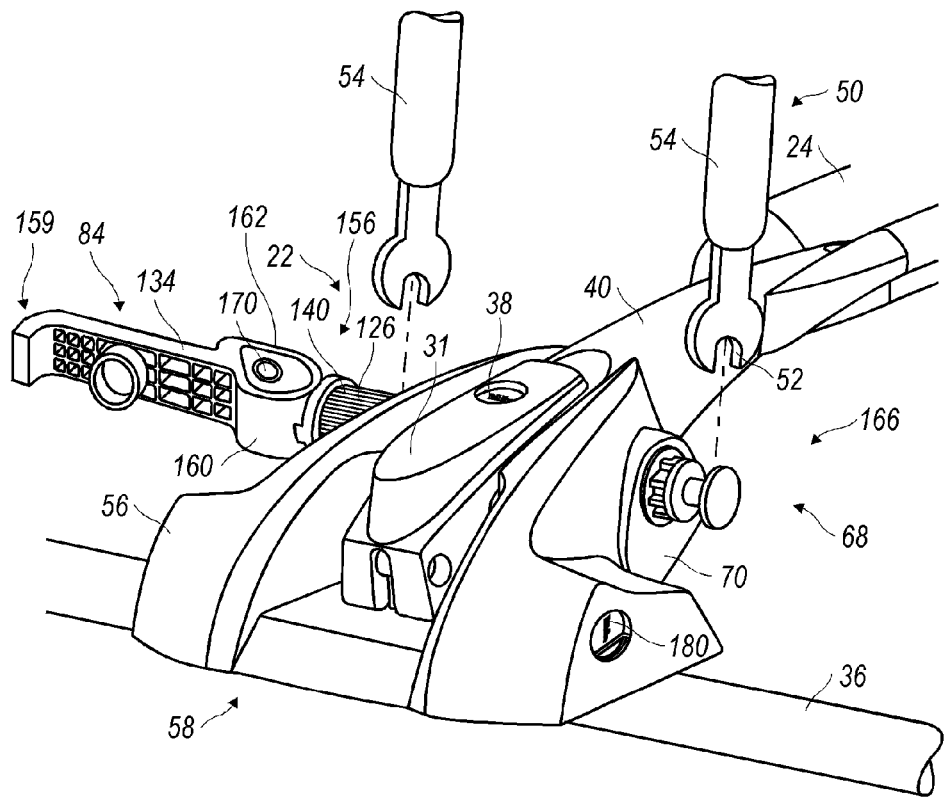
FIG. 4d is a close-up perspective view of a quick release fork mount assembly according to the present invention receiving a conventional, recessed type fork assembly.
Figure 4E:
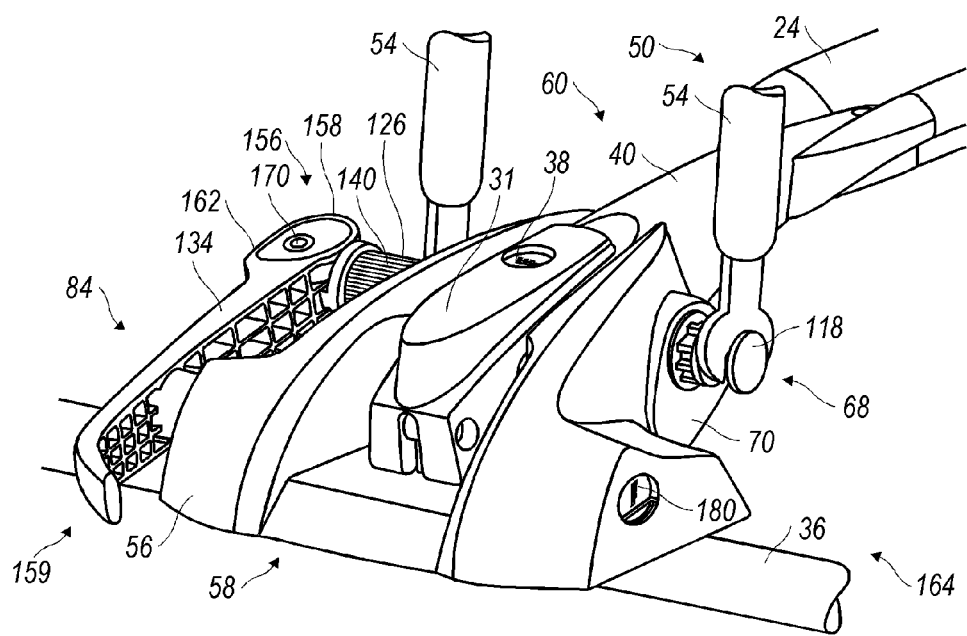
FIG. 4e is a close-up perspective view of a quick release fork mount assembly according to the present invention securing a conventional, recessed type fork assembly.
Figure 5A:
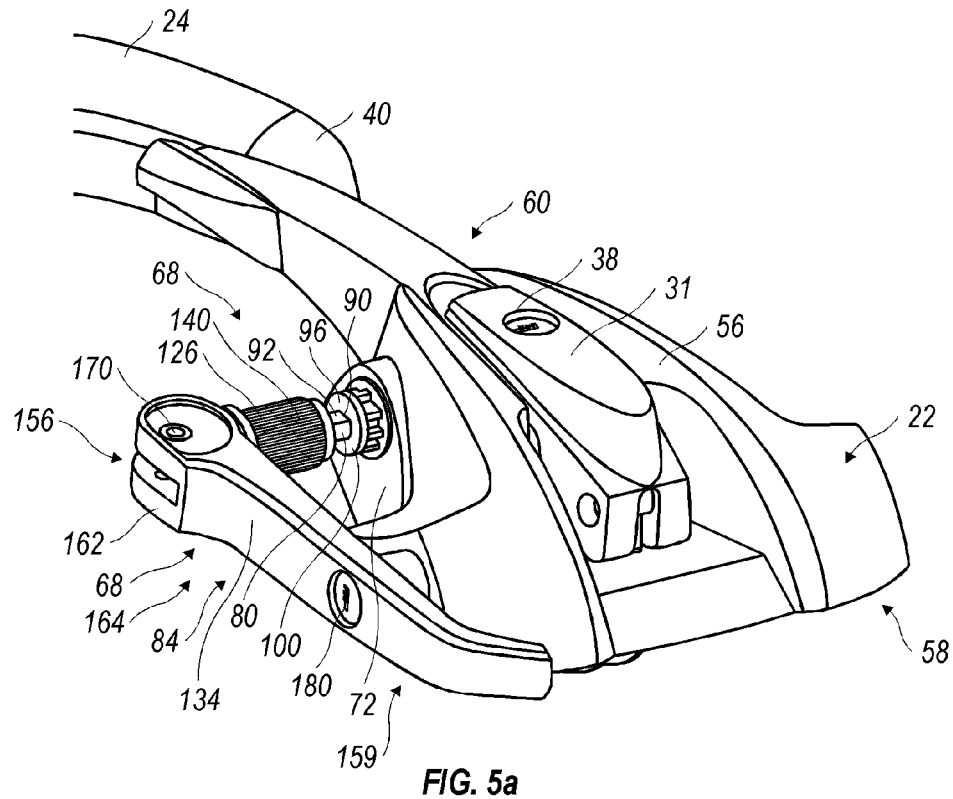
FIG. 5a is a close-up perspective view of a right side of a quick release fork mount assembly according to the present invention with an adapter body for securing a conventional, clevised fork assembly thereto.
Figure 5B:
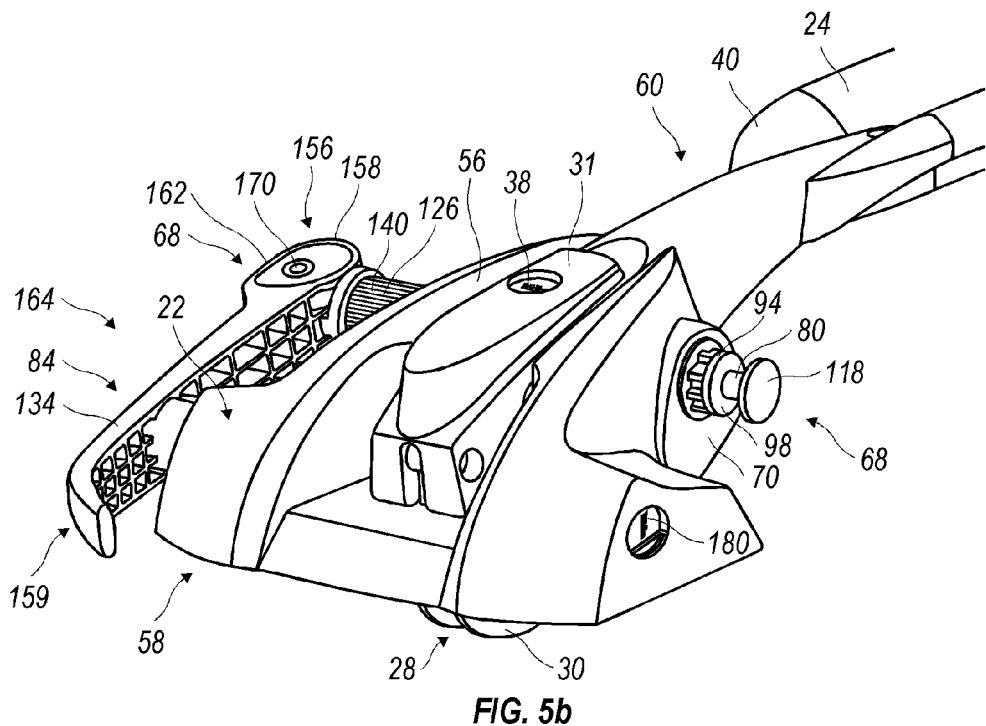
FIG. 5b is a close-up perspective view of a left side of a quick release fork mount assembly according to the present invention with an adapter body for securing a conventional, clevised fork assembly thereto.
Figure 6A:
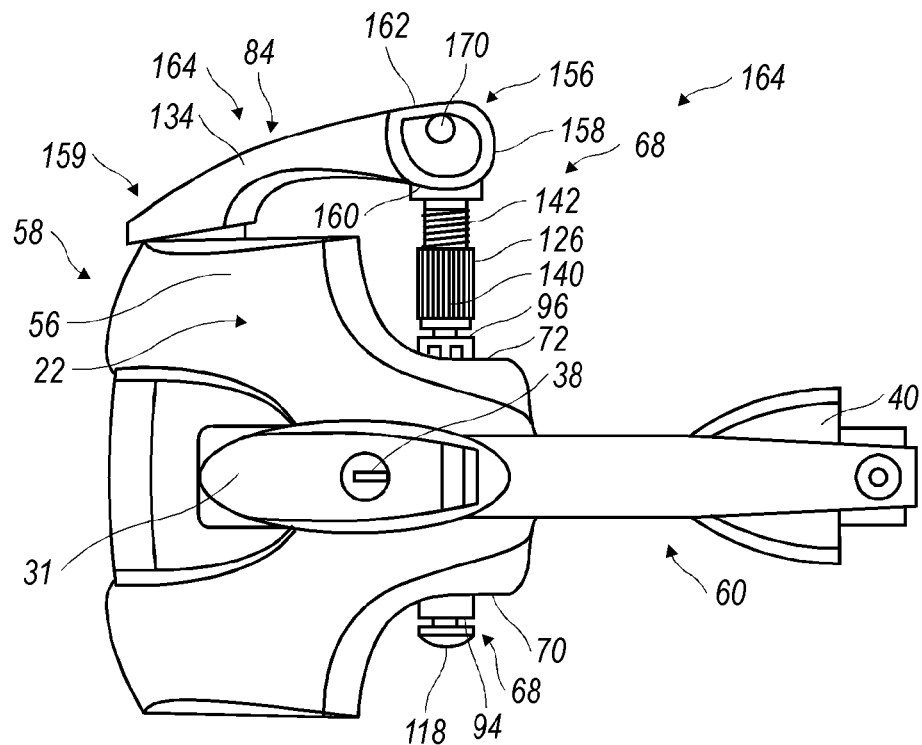
FIG. 6a is a top plan view of a quick release fork mount according to the present invention in an engaged, fork securing position.
Figure 6B:
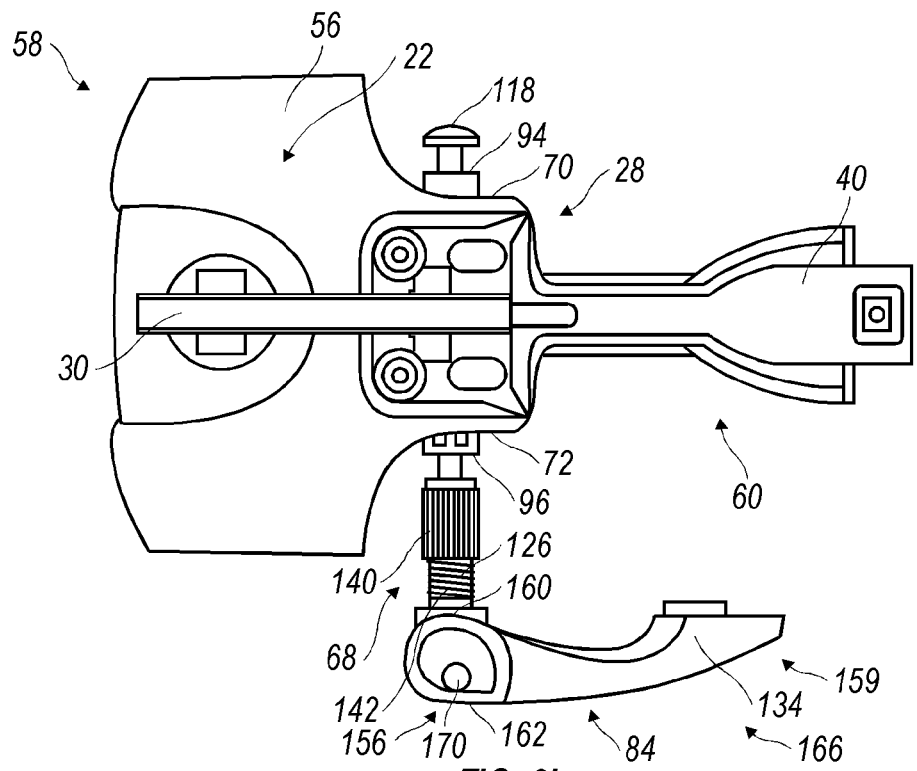
FIG. 6b is a bottom plan view of a quick release fork mount according to the present invention in a disengaged, fork releasing position.
Figure 7A:
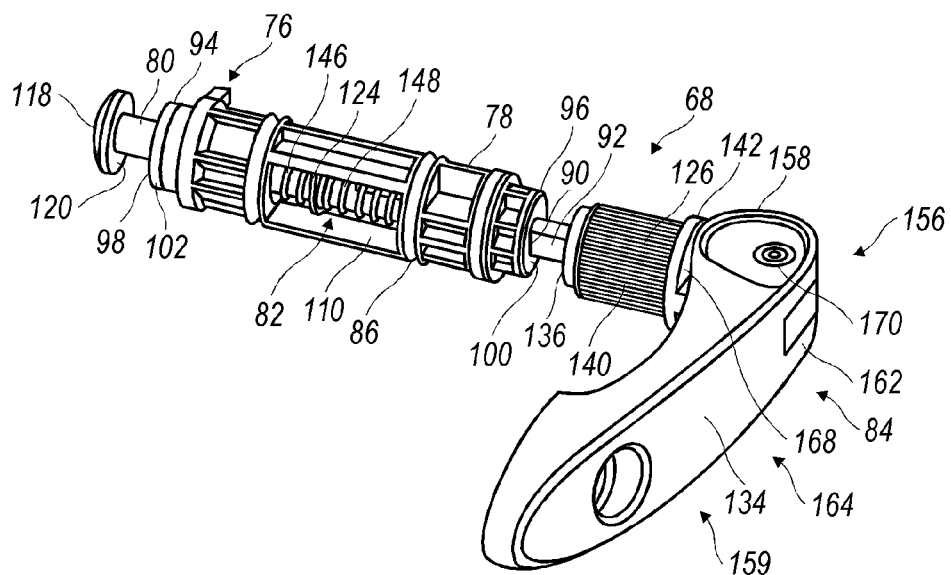
FIG. 7a is a perspective view of a skewer/adapter body/clamping assembly according to the invention wherein the clamping assembly is in an engaged, fork securing position.
Figure 7B:
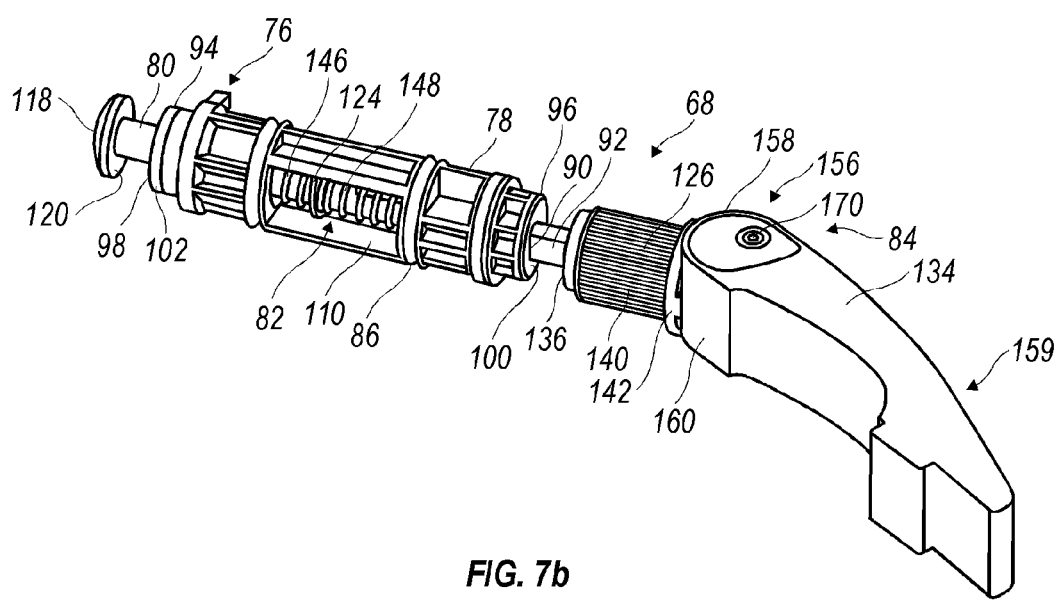
FIG. 7b is a front plan view of the skewer/adapter body/clamping assembly illustrating the clamping lever being pivoted toward the disengaged, fork receiving position.
Figure 7C:
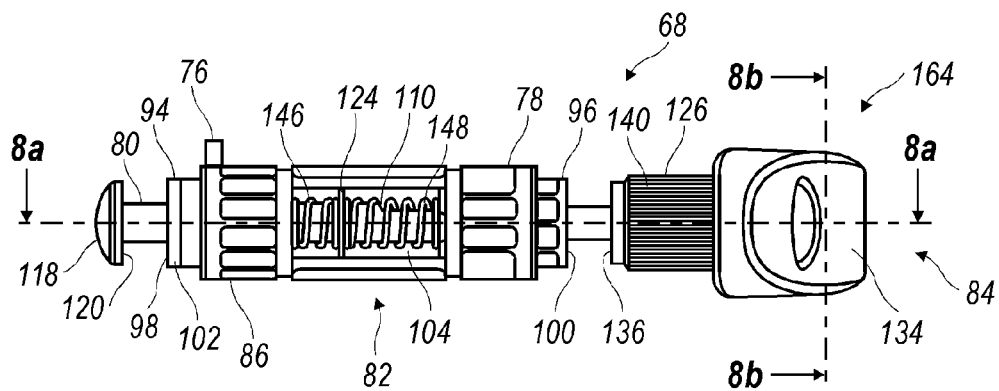
Figure 8A:
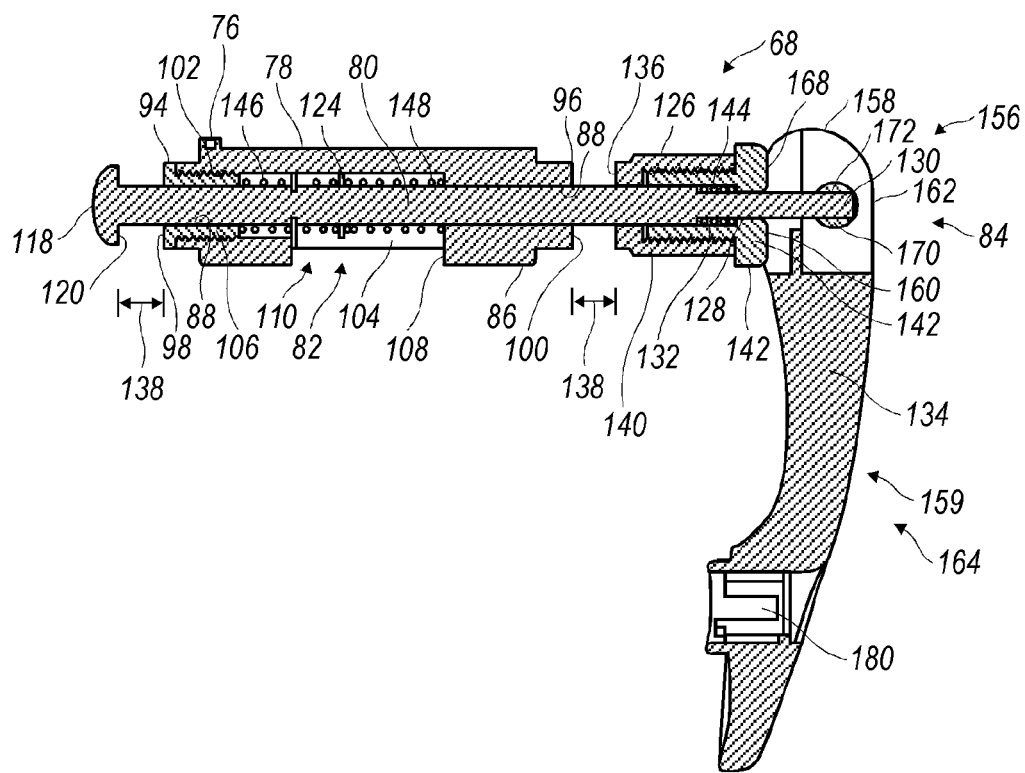
FIG. 8a is a cross-sectional view of the skewer/adapter body/clamping assembly in an engaged, fork securing position, taken generally along line 8a-8a of FIG. 7c.
Figure 8B:
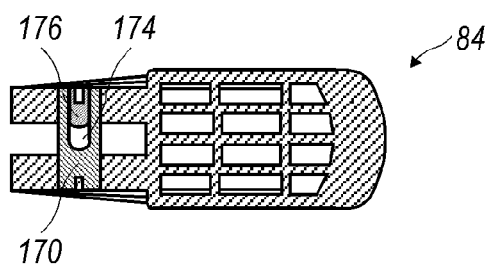
FIG. 8b is a cross-sectional view of the skewer/adapter body/clamping assembly taken generally along line 8b-8b of FIG. 7c.
Figure 8C:
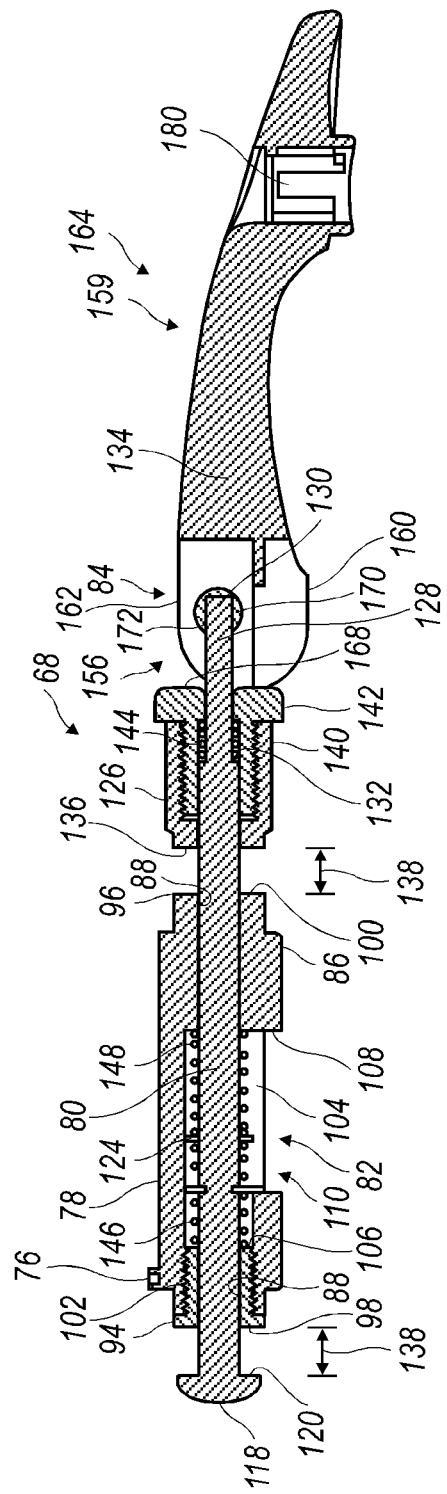
FIG. 8c is a cross-sectional view of the skewer/adapter body/clamping assembly in an engaged, fork securing position, taken generally along line 8a-8a of FIG. 7c, but illustrating the clamping assembly in a disengaged, fork receiving position.
Figure 9A:
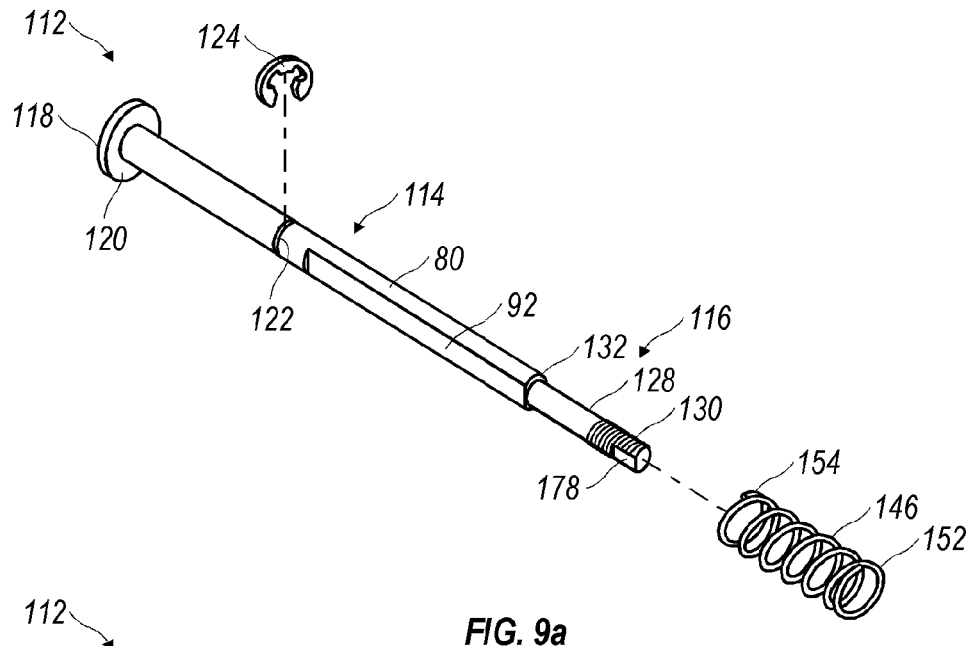
FIG. 9a is an exploded view of a skewer assembly according to the present invention.
Figure 9B:
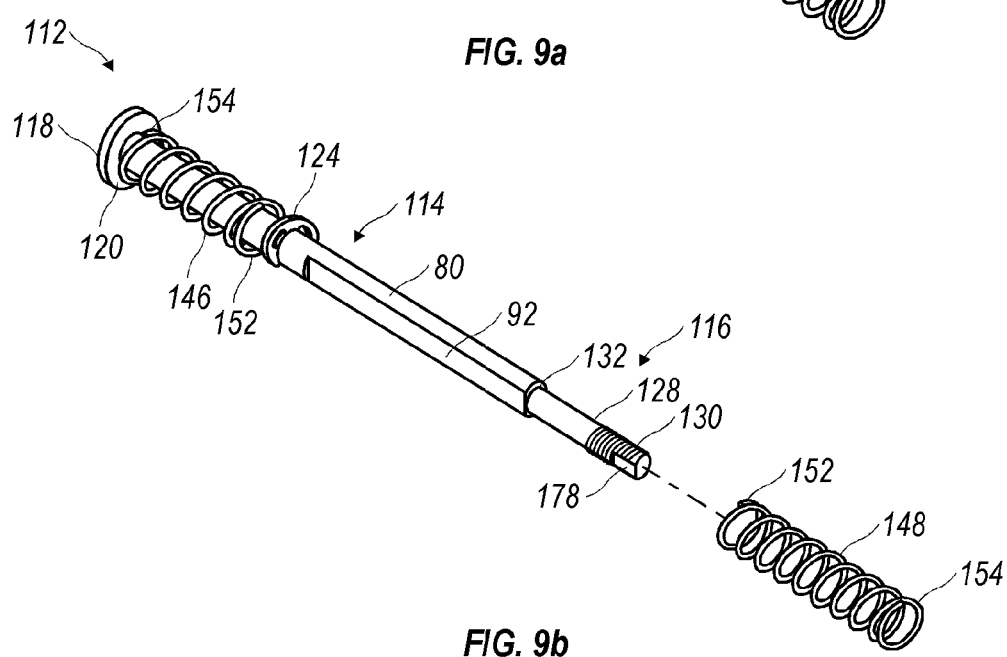
FIG. 9b is a partial exploded view of a skewer assembly according to the present invention illustrating attachment of biasing members; and, FIG. 9c is a perspective view of a skewer assembly according to the invention.
Figure 9C:
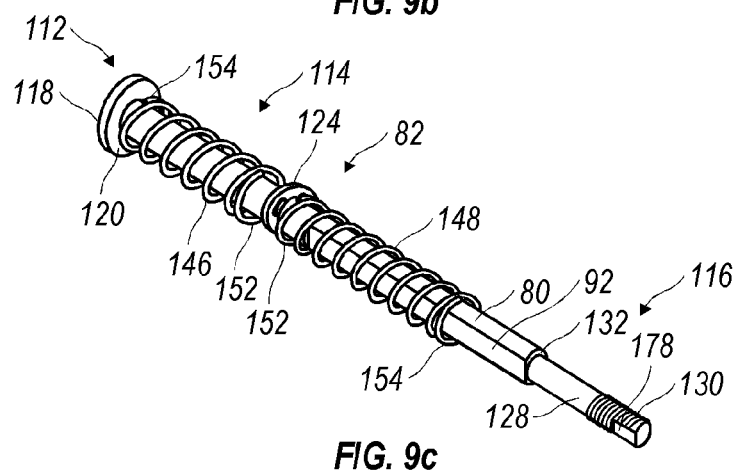

Alternatively, as illustrated in FIGS. 4d and 4e, where a bicycle comprising conventional forks 50 is to be secured utilizing the fork mount of the present invention, a user need first insert conventional fork adapter 68 within hollow 62 until locking abutment 76 mates with recess 74. Similar to adapter 66, a pin member (not shown) of either the recess or the locking abutment may then be utilized to secure the conventional fork adapter within the hollow 62. Thereafter, after having already removed the front wheel from the conventional fork and assuring that the conventional fork adapter is in a disengaged position, the clevises of the conventional fork may then be slid upon the skewer in the spaces between prong engaging walls 98, 120 and prong engaging walls 100, 138. As previously noted, the skewer of conventional fork adapter 68 does not require "centering" with respect to the adapter body prior to loading; the bias applied by the biasing assembly causes the ends of the skewer to be oppositely displaced in a direction that is away from the adapter body such that an ends-extended configuration of the skewer is automatically assumed. After sliding the forks upon the skewer, adjustable prong engaging member 126 may be axially adjusted, if needed, and clamping lever 134 actuated toward the engaged position. Movement of the clamping lever toward the engaged position displaces skewer 80 such that the distance between prong engaging walls 98, 120 and prong engaging walls 100, 138, respectively, is closed and the prongs secured therebetween. After the clamping lever is moved to the fully engaged position, it may be locked in place by securing lever portion 159 to housing 56 by means of locking assembly 180, or other means. Removal of the conventional fork from the fork mount may be accomplished by reversing the steps set forth above.

Thus, is seen that the present invention provides a quick release fork mount assembly that is easy to use and which is capable of stably securing a number of different fork types upon a load carrier. It should be appreciated by those having ordinary skill in the art that while the present invention has been illustrated and described in what is deemed to be the preferred embodiments, various changes and modifications may be made to the invention without departing from the spirit and scope of the invention. Therefore, it should be understood that the present invention is not limited to the particular embodiments disclosed herein.

What is claimed is:

1. A bicycle fork mount configured to receive and secure a front an axle hub assembly of a through-axle type front bicycle wheel, but which is temporarily adapted to receive a fork of a skewer type front bicycle wheel, said adapted bicycle fork mount comprising:
   a fork mount body having a hollow configured to insertably receive a front axle hub assembly of a through-axle front bicycle wheel;
   an adapter received in said hollow and having a fork receiving skewer associated therewith configured for translational movement relative to said adapter; and
   a biasing assembly disposed between said adapter and said skewer that urges said skewer toward an ends-extended configuration in which a pair of fork receiving ends of said skewer are oppositely disposed beyond lateral sides of the fork mount body for receiving and releasably securing the fork of a bicycle having a skewer type front wheel to the bicycle fork mount,
   wherein said hollow is shaped and sized to substantially encircle both said front axle hub assembly and said adapter when either is received in said hollow to provide a substantial conformance fit therewith,
   said biasing assembly abuttingly engages said adapter and said skewer, and
   a portion of said biasing assembly that abuts said adapter is fixed relative to said fork mount body while a portion of said biasing assembly that abuts said skewer translates relative to said fork mount body during return to the ends-extended configuration of said skewer after being displaced therefrom.

2. The bicycle fork mount as recited in claim 1, wherein said adapter further comprises an exterior surface having a predominantly cylindrical shape, which is configured for a conformance fit within said hollow of said fork mount body.

3. The bicycle fork mount as recited in claim 1, wherein said biasing assembly is a bi-directional spring mechanism capable of urging translational movement of said skewer in either of two directions relative to said adapter.

4. The bicycle fork mount as recited in claim 1, wherein said adapter further comprises an interior trap-space within which said biasing assembly is housed.

5. The bicycle fork mount as recited in claim 4, wherein said biasing assembly abuttingly engages an interior surface of said trap-space and an exterior surface of said skewer.

6. The bicycle fork mount as recited in claim 1, wherein said biasing assembly comprises a coil spring in contact with said adapter and said skewer.

7. The bicycle fork mount as recited in claim 1, wherein said biasing assembly comprises a pair of springs, each in contact with said adapter and said skewer.

8. The bicycle fork mount as recited in claim 7, wherein each of said pair of springs is a coil spring.

9. The bicycle fork mount as recited in claim 1, wherein said biasing assembly comprises at least two springs, each in contact with said adapter and said skewer.

10. The bicycle fork mount as recited in claim 9, wherein each of said at least two springs is a coil spring.

11. The bicycle fork mount as recited in claim 1, wherein said skewer is provided with an exterior projection against which said biasing assembly abuts.

12. The bicycle fork mount as recited in claim 11, wherein said projection off of said skewer forms a flange surface against which said biasing assembly abuts.

13. The bicycle fork mount as recited in claim 12, wherein said flange surface projects substantially radially about a longitudinal axis of said skewer.

14. The bicycle fork mount as recited in claim 13, wherein said substantially radially oriented flange surface is formed by a snap-ring seated in a track provided on said skewer.

15. The bicycle fork mount as recited in claim 1, wherein said hollow is a substantially cylindrically shaped channel extending through said fork mount body and between lateral sides thereof.

16. The bicycle fork mount as recited in claim 8, wherein each one of said pair of fork receiving ends comprises a prong engaging wall, said biasing assembly oppositely displacing each said prong engaging wall away from said adapter.

17. The bicycle fork mount as recited in claim 16, further comprising a clamping assembly, the clamping assembly coupled to the skewer and configured to axially displace the skewer between fork securing and fork releasing positions.

18. The bicycle fork mount as recited in claim 17, wherein at least one of the prong engaging walls is displaced toward the other when the clamping assembly is moved from the fork releasing position to the fork securing position.

19. The bicycle fork mount as recited in claim 1, wherein the hollow extends between lateral sides of the fork mount body and forms an aperture on each of said lateral sides thereby providing an opening to said hollow.

20. The bicycle fork as recited in claim 19, wherein said hollow is sized and shaped to permit removal of said adapter from said hollow through either of said apertures.

21. The bicycle fork as recited in claim 19, where said adapter is sized and shaped for removal from said hollow through either of said apertures.

22. The bicycle fork mount as recited in claim 1, wherein the hollow is a substantially cylindrical channel that extends between lateral sides of the fork mount body.

23. A fork mount for releasably securing a through-axle fork, or alternatively, a conventional fork, said fork mount comprising:
   a fork mount body having a void for receiving an axle hub member of said through-axle fork,
   an adapter receivable in said void and having a skewer associated therewith, said skewer having first and second prong engaging surfaces on opposite ends thereof, said skewer configured for translational movement with respect to said adapter; and
   a biasing assembly disposed between said adapter and said skewer, said biasing assembly urging said skewer such that said first and second prong engaging surfaces are oppositely displaced away from said adapter, said skewer configured for slidably receiving and releasably securing slotted prongs of said conventional fork,
   wherein said void is shaped and sized to substantially encircle both the axle hub member and said adapter having a skewer when either is received in said hollow to provide a substantial conformance fit therewith,
   said biasing assembly abuttingly engages said adapter and said skewer, and
   a portion of said biasing assembly that abuts said adapter is fixed relative to said fork mount body while a portion of said biasing assembly that abuts said skewer translates relative to said fork mount body during return to the ends-extended configuration of said skewer after being displaced therefrom.

24. A bicycle fork mount configured to receive and secure a through-axle fork, but which is temporarily adapted to receive a conventional fork, said adapted bicycle fork mount comprising:
   a fork mount body having a hollow configured to insertably receive a front axle hub assembly of a through-axle fork;
   an adapter received in said hollow and having a fork receiving skewer associated therewith and which is configured for translational movement relative to said adapter; and
   a biasing assembly disposed between said adapter and said skewer that urges said skewer toward an ends-extended configuration in which a pair of fork receiving ends of said skewer are oppositely disposed beyond lateral sides of the fork mount body for receiving and releasably securing slotted prongs of a conventional fork to the bicycle fork mount,
   wherein said hollow is shaped and sized to substantially encircle both the axle hub member and said adapter having a skewer when either is received in said hollow to provide a substantial conformance fit therewith,
   said biasing assembly abuttingly engages said adapter and said skewer,
   said skewer is provided with an exterior projection against which said biasing assembly abuts,
   said projection off of said skewer forms a flange surface against which said biasing assembly abuts,
   said flange surface projects substantially radially about a longitudinal axis of said skewer, and
   said substantially radially oriented flange surface is formed by a snap-ring seated in a track provided on said skewer.

* * * * *